United States Patent [19]

Johanning et al.

[11] Patent Number: 4,487,542
[45] Date of Patent: Dec. 11, 1984

[54] GASTIGHT HIGH-RISE SILOS

[75] Inventors: Hermann Johanning; Heinz G. Aulbert, both of Melle, Fed. Rep. of Germany

[73] Assignee: Engelbrecht & Lemmerbrock GmbH & Co., Melle, Fed. Rep. of Germany

[21] Appl. No.: 413,690

[22] Filed: Sep. 1, 1982

[30] Foreign Application Priority Data

Sep. 8, 1981 [DE] Fed. Rep. of Germany ....... 3135439

[51] Int. Cl.³ .............................................. B65G 67/06
[52] U.S. Cl. .................................... 414/292; 414/298; 414/301; 414/323; 414/304; 414/288; 414/317; 222/564
[58] Field of Search ................ 414/288, 292, 298, 301, 414/304, 317; 222/564

[56] References Cited

U.S. PATENT DOCUMENTS

| 2,915,205 | 12/1959 | Strader | 414/294 X |
| 3,211,303 | 10/1965 | van der Linde et al. | 414/302 X |
| 3,358,856 | 12/1967 | Weibull | 414/298 |
| 4,350,468 | 9/1982 | Julke | 414/317 X |

FOREIGN PATENT DOCUMENTS

2324883 12/1974 Fed. Rep. of Germany ...... 414/317

Primary Examiner—Joseph E. Valenza
Assistant Examiner—Stuart Millman
Attorney, Agent, or Firm—Balogh, Osann, Kramer, Dvorak, Genova & Traub

[57] ABSTRACT

This invention relates to the draining of bulk materials which are not spontaneously flowable, from a high-rise silo in which the bulk material is fed from the top layer of the bulk material at any instant, into a central gravity shaft having a bottom extraction facility. To this end, the invention consists in a gravity shaft which is combined with the gastight high-rise silo and is rigid, stationary, tubular and closable at the bottom. The shaft is provided with perforations distributed along its height and circumference, of which at least one is situated at each vertical position of the prevailing level of bulk material. The bottom of the shaft can be sealed off with a slider or a plug of the material which is permitted to be built up to a predetermined height.

12 Claims, 12 Drawing Figures

GASTIGHT HIGH-RISE SILOS

BACKGROUND OF THE INVENTION

The present invention relates to gastight high-rise silos provided with a respirator bag, for reception of bulk goods which are not spontaneously flowable and which are conveyed radially inwards from the outside to a central vertical gravity shaft from the top layer of the material by at least one feed element comprising clearing elements, said feed element distributing the material whilst the silo is being filled.

It is known that materials which are not spontaneously flowable may be extracted from high-rise silos by periodically carrying the top layer in each case radially inwards from the outside by means of revolving conveyors to the opening of a pneumatic suction removal duct or to a central gravity shaft having a transverse bottom conveyor. In the first case, the pneumatic conveying performance is restricted and it is consequently more advantageous to perform the extraction via a central gravity shaft because it is then possible by means of mechanical bottom conveyors to accomplish high extraction performances and to shut the silo off hermetically at the top. Depending on the material of the charge, gases are generated during the loading of the silo in such cases, which consume the oxygen within the silo or which are impelled out of the top section of the silo, either into a respirator bag or to the outside via valves.

It is an object of the invention to combine a gastight high-rise silo with a device for extraction of bulk goods which are not spontaneously flowable, such as granulated or ungranulated corn cob mix or the like, which comprises a gravity shaft which has a particularly uncomplicated structure and does not require any moving parts or mechanical systems.

SUMMARY OF THE INVENTION

In accordance with the invention, this and other problems are resolved in that the gastight high-rise silo has combined with it a rigid, stationary tubular gravity shaft of optional cross-section and closable at the bottom, which terminates above the maximum level of the material in the silo and is provided with perforations distributed along its height and circumference, of which at least one is situated at each vertical position of the momentary level of the material surface dropping by being removed.

As a result of this construction, it is now possible to extract bulk material in large quantities via the gravity shaft, and the gravity shaft is retained constantly as such throughout its height, but it may nevertheless be supplied with the not spontaneously flowable material by means of rotating clearing elements (which may be known per se), so that the said material drops to the bottom in the shaft and may be remoed at this point by means of a transverse mechanical conveyor of any desired kind. To accelerate the draining of the silo, it is advantageous to install the clearing elements of the feed elements with increased diameter or height directly on the shaft or to install them at a lower position compared to the other clearing elements, so that these clearing elements generate a clearing funnel having its vertex downwardly directed towards the shaft axis from the surface of the material and thereby feed the material to the shaft over a greater height through the perforations. The greater quantity of material dropping down may easily be accommodated within the shaft and removed below the shaft by means of the transverse mechanical conveyor provided thereat.

Due to the sealed gastight silo comprising a respirator bag and the gravity shaft closable at the bottom, the charge of material in the top layer in question remains constantly fresh and cannot spoil since it is possible to shut off the bottom transverse passage for extraction of material by means of a slider or the like, so that no air or oxygen is supplied to the uncovered top section in the silo which could lead to spoiling of the material. An additional closure of the gravity shaft may be produced in this direction without other mechanical devices, as will be described at a later stage.

Owing to the rigid structure of the gravity shaft, it may have any desired cross-section, a particularly uncomplicated design being possible with a quadrangular or polygonal cross-section, as remains to be described in particular.

BRIEF DESCRIPTION OF THE DRAWINGS

In order that the invention may be more clearly understood, reference will now be made to the accompanying drawings which illustrate one embodiment by way of example and in which.

DETAILED DESCRIPTION OF THE PREFERRED EMBODIMENTS

Figure 1:
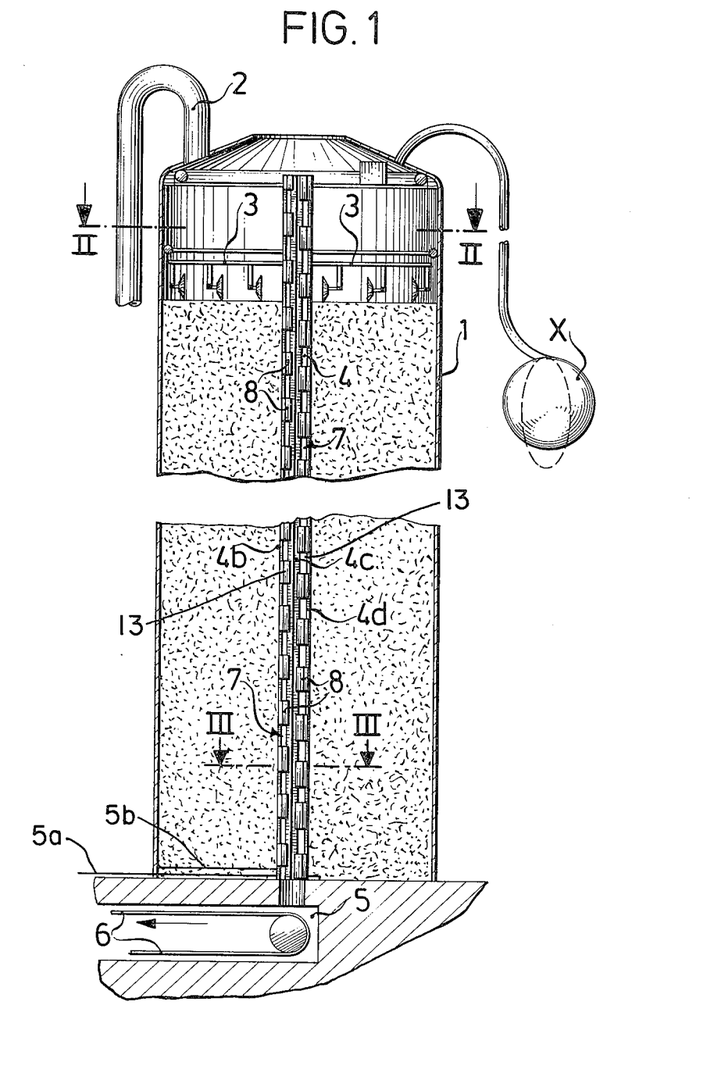
FIG. 1 shows a diagrammatic axial section through a circular high-rise silo comprising a gravity shaft, during extraction clearing the silo.
Figure 2:
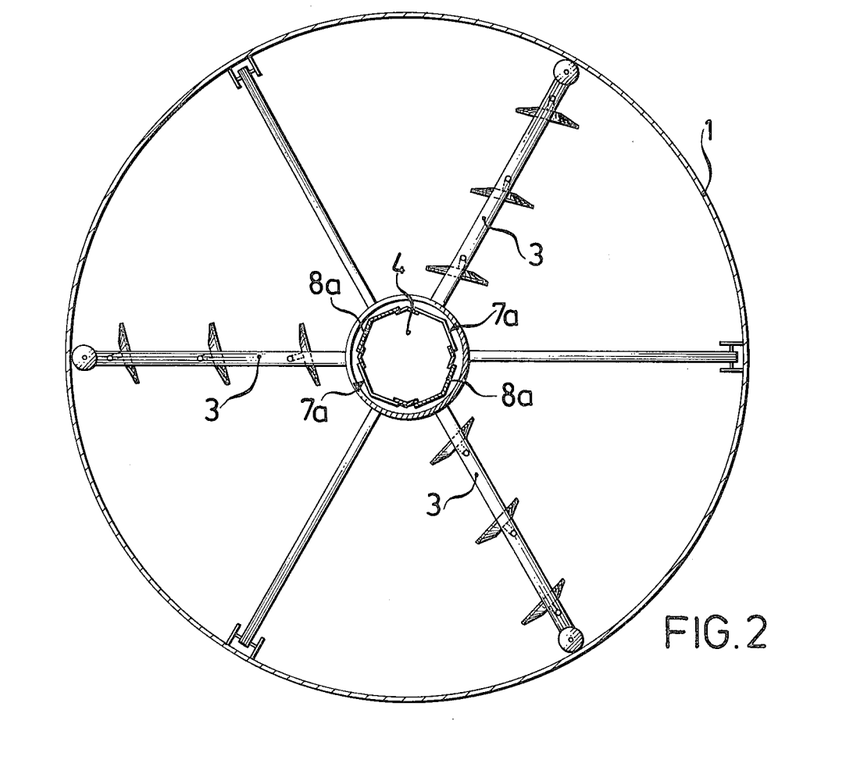
FIG. 2 shows an enlarged diagrammatical cross-section along the line II—II of FIG. 1.

Referring now to the drawings, a central gravity shaft 4 having any desired cross-section is installed in a gastight high-rise silo 1 provided with a respirator bag, in the form of a rig stationary tube. At the bottom, the shaft 4 opens into a transversely-extending passage 5 wherein is provided a mechanical transverse conveyor 6 of any desired kind practically shutting off the shaft 4 at the bottom, onto which the material drops from the gravity shaft 4 and is conveyed to a consumption point. The passage 5 may be shut off in sealed manner by means of a slider which is simply shown as a slider plate 5a slidably disposed in a slot 5b, to prevent penetration of ambient air into the top section of the silo 1 via the passage 5 and shaft 4. In any event, the gravity shaft 4 terminates above the maximum level of the material to be fed in, in the top of the silo 1.

Figures 3, 4, 5:
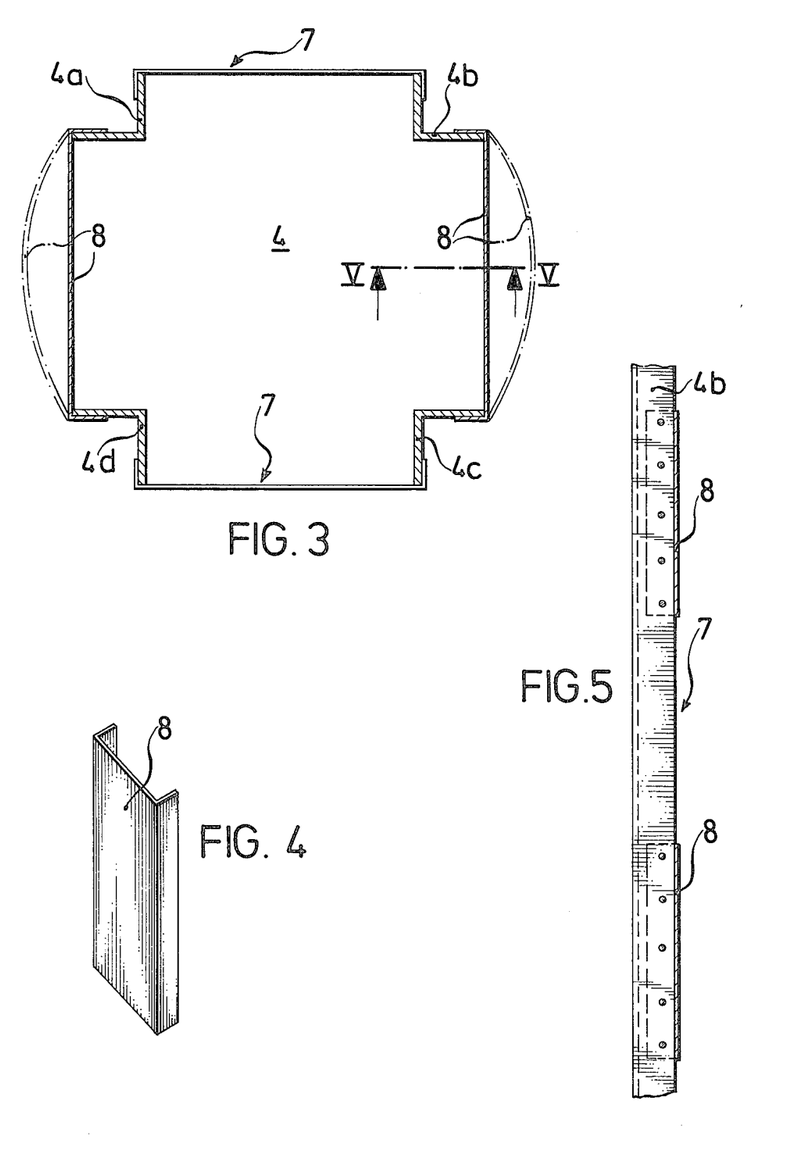
FIG. 3 shows a cross-section through the gravity shaft along the line III—III of FIG. 1.
FIG. 4 shows a view in perspective of a length of plate for assembling the gravity shaft.
FIG. 5 shows a partial axial section through the shaft wall along the line V—V of FIG. 3.

In this embodiment, the gravity shaft 4 comprises four vertical supporting sections 4a, 4b, 4c and 4d, for example in the form of angle sections which practically enclose a square in cross-section (FIG. 3) and the angle corners of which are directed inwardly. It may be advantageous for the square cross-sectional areas enclosed by the sections to increase from the top towards the bottom.

Figure 6:
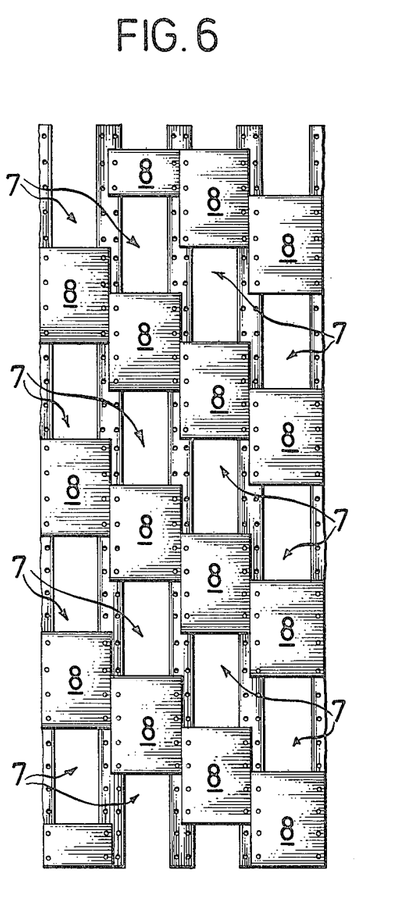
FIG. 6 shows a modified development of a partial height of the shaft with spiral installation of the plate lengths or sections.

Along a particular height reckoned from the silo floor, spaces 7 between two supports 4a, 4b and 4c, 4d remain unoccupied and these unoccupied open spaces or surfaces 7 alternate along the periphery with vertical plate sections 8 the edges of which are angled (FIG. 4) and may consequently be joined to the corresponding branches of the two adjacent sections 4b, 4c and 3a, 4d. Two mutually opposed open spaces or surfaces 7 and two mutually opposed plate sections 8 thus form a ring, and rings of this nature are installed one above another to a point beyond the height of the material in the silo, in such manner that the free spaces 7 and plate sections 8 also alternate or partly overlap vertically. The alternation between the open surfaces 7 and of the plate sections 8 is apparent from the shaft development according to FIG. 6. Instead of plane plate sections 8, it is also possible to utilize cylindrically curved plate sections as shown in dotted lines in FIG. 3.

Figure 8:
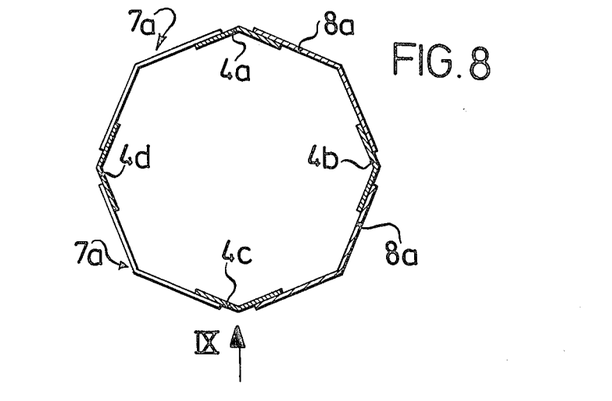
FIG. 8 shows a cross-section through an octagonal gravity shaft.
Figure 9:
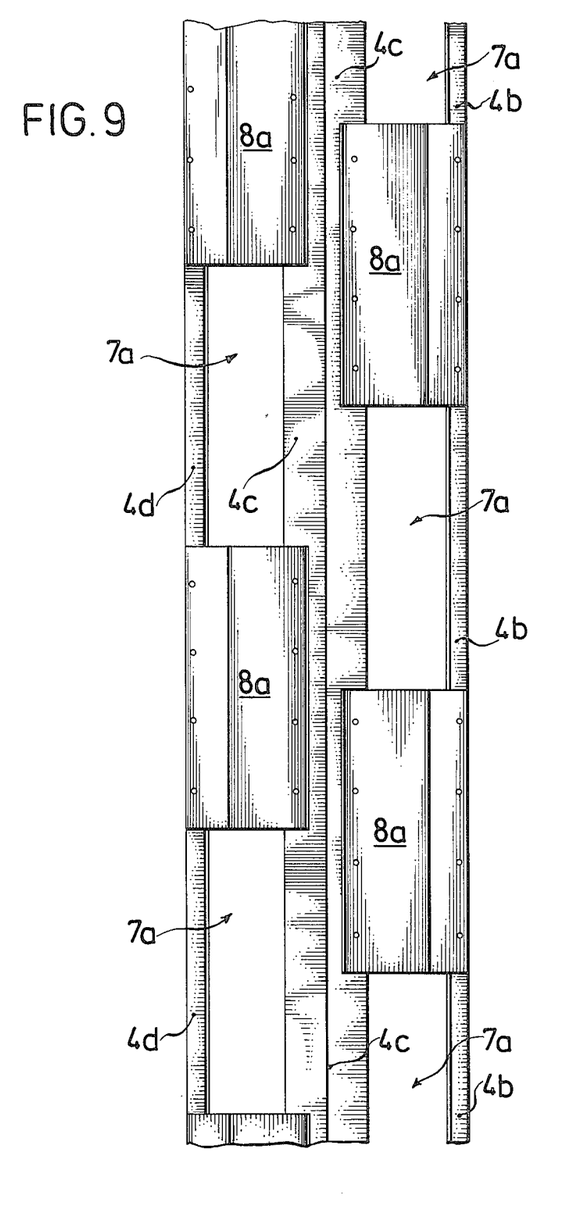
FIG. 9 shows a partial sideview of the gravity shaft as seen in the direction of the arrow of IX FIG. 8.

It is also possible to increase the number of supporting sections 4a, 4b . . . , so that these may be thought to enflank a circular or polygonal cross-section. According to FIGS. 8 and 9, it is also possible to make the supporting sections as angle sections 4a–4d having outwardly directed angle edges. Whilst leaving surfaces or areas 7a uncovered, the branches of these angle sections have connected to the angle plate lengths or sections 8a whose angle edge is equally outwardly directed. This advantageous form of the shaft 4 is then octagonal in cross-section and approximates a circular cross-section.

Figure 7:
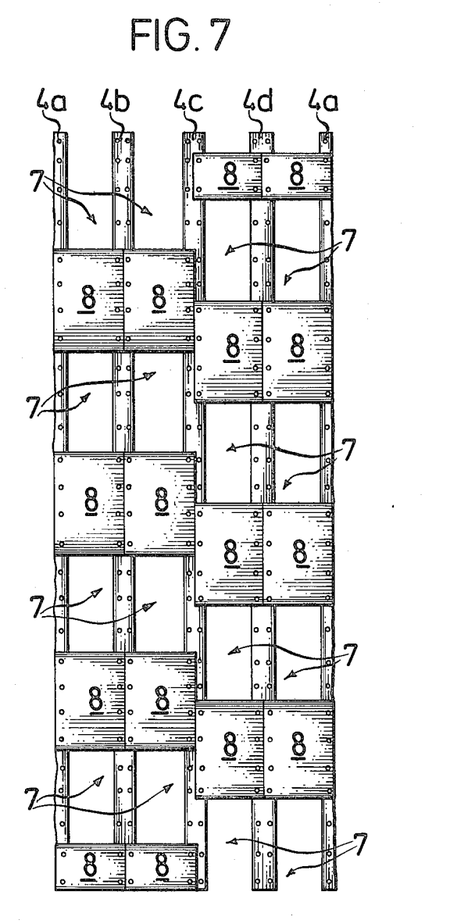
FIG. 7 shows a plane development of a partial height of the shaft according to FIG. 3.

Along the periphery of each ring, at least one plate section 8 or 8a has to be replaced by an open surface of area 7 or 7a, so that the material is conveyed into the gravity shaft 4 through an open space or perforation 7, 7a of this kind, during every rotation of the conveying elements 3. If two open areas 7, 7a are provided for each ring according to FIG. 3, the material has to be entrained through 180° in each caase by the conveying elements 3 until it is conveyed into the shaft 4. As already stated, it is also possible for alternating open areas 7, 7a and plate sections 8, 8a to be arranged in the form of a spiral, as shown by the development of the shaft according to FIG. 6. In this case, too, at least one open area 7, 7a or perforation 7, 7a should in any event be present at each extraction level as in all other cases, the open areas 7, 7a and the plate sections 8, 8a also being liable to overlap a little as apparent from FIG. 7.

As already stated, the bottom end of the gravity shaft 4 may be shut off by a slider or the like, to prevent access of air to the top section of the silo. It is also possible however that a complementary sealing operation be undertaken with or without the slider closure. To this end, the procedure followed is that measuring instruments 13 (denoted diagrammatically in FIG. 1) are fitted at an appropriate height within the gravity shaft 4. When the transverse bottom conveyor 6 is stopped, the conveyors 3 for extraction of material still remain in operation for a brief period, meaning that material passes from the silo into the gravity shaft 4, which is no longer removed at the bottom however but forms a plug of material in the lower section of the gravity shaft. As soon as this plug of material piling up in the shaft 4 reaches the height of the measuring instruments 13, these transmit a pulse, thereby turning off the drive of the top conveying elements 3. The plug then remains in the bottom of the gravity shaft and thereby forms a seal which prevents access of ambient air to the top section of the silo.

Figure 10:
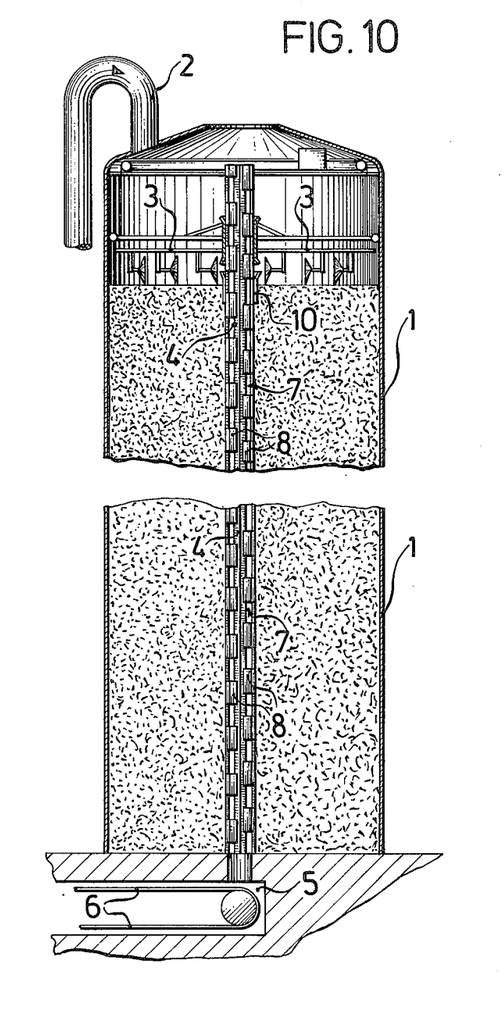
FIG. 10 shows an illustration corresponding to FIG. 1, with coverage of the gravity shaft during the loading of the silo.
Figure 11:
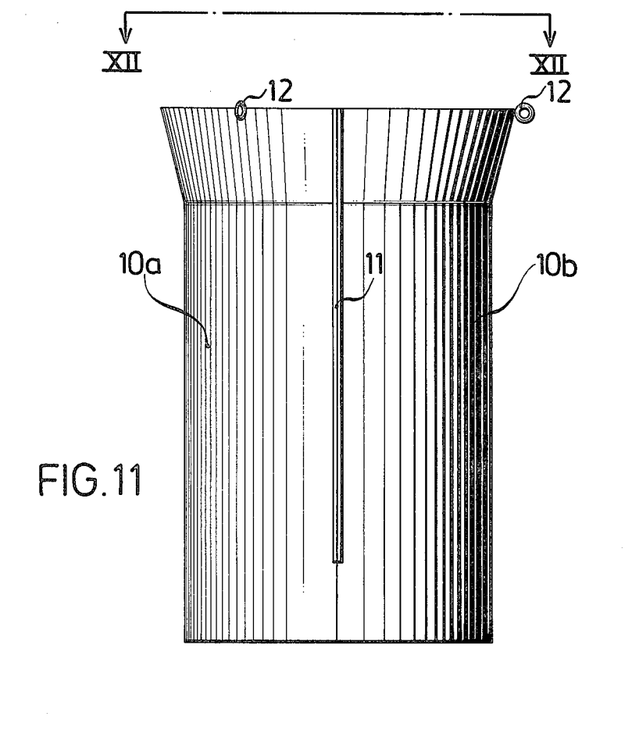
FIG. 11 shows an enlarged sideview of the cover of the gravity shaft.
Figure 12:
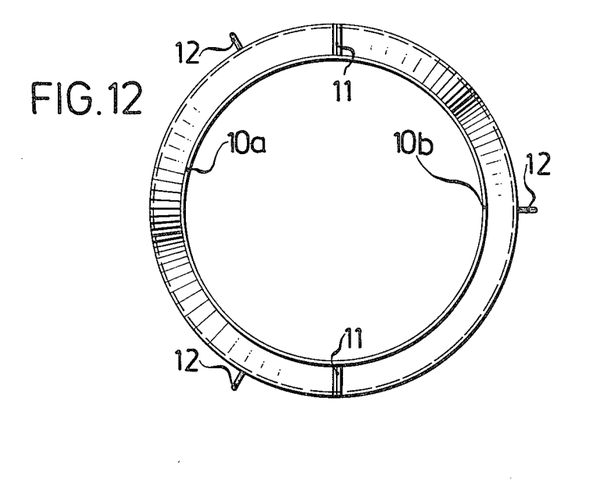
FIG. 12 shows a plan view of the cover, an seen from the line XII—XII in FIG. 11.

To load the silo 1, e.g. via the conveying duct 2 or a mechanical conveyor, the angle of incidence of a part of the clearing elements of the conveying elements 3 liftable in upward direction with the proportion of the charge is reversed, so that the material fed in is thereby distributed evenly over the surface of the filled level. Upon feeding the material into the silo, partial quantities may pass into the shaft 4 via the perforations 7, 7a. So that this may largely be prevented, the feed elements 3 acting as distributors or spreaders during the charging operation are connected to a cover 10 (FIG. 10) which is removable and surrounds the shaft 4, which is lifted with the feed elements 3 so that a penetration into the silo of the material conveyed into the silo through the perforations 7, 7a is prevented in the region of the top layer of the material at any instant. Since the bulk materials are not spontaneously flowable, as herein specified, the material remains in position below the cover 10 which is to be lifted. According to FIGS. 11 and 12, the cover 10 is formed by a cylinder 10 assembled from two half-cylinders 10a, 10b via flanged connections 11, which widens conically in the upper portion and at this point is provided with lugs 12 or the like, by means of which it is joined via cables or the like to the liftable feed elements 3. After feeding the flanged connections 11, the cover 10 may be removed after the silo is charged, by freeing the two half-cylinders from each other.

We claim:

1. In a gastight high-rise silo of the kind provided with a respirator bag, for reception of bulk goods which are not spontaneously flowable, and which are conveyed inwards from the outside to a central vertical gravity shaft from the top layer of the material and in radial direction by at least one feed element comprising clearing elements, said feed element distributing the material whilst the silo is being filled, the invention which consists in that said silo has combined with it a rigid, stationary, tubular gravity shaft, means for closing the bottom of said shaft, said shaft terminating above the maximum level of the material within said silo and is provided with perforations distributed along its height and circumference, of which at least one said perforation is situated at each vertical position of the momentary level of the surface of the material dropping by being cleared, and wherein said feed element includes clearing elements and is reversible in its direction of rotation and liftable during the loading of said silo, and is connected to a removable cover surrounding said shaft, which cover, in the areas of the momentary top layer of the material, prevents a penetration of the material running into said silo into said shaft through said perforations.

2. A silo according to claim 1, wherein said cover is a cylinder comprising two releasably connectible semi-cylinders.

3. A silo according to claim 1, wherein said clearing elements of said feed element or elements is formed or fitted directly on said shaft so that, whilst revolving on said shaft they generate a material funnel starting from the surface of the material and tapering with the apex downwards with respect to the axis of said shaft.

4. A silo according to claim 1, wherein said gravity shaft comprises horizontal rings or turns installed one above another and formed by unbroken peripherally distributed perpendicular plate lengths and at least one area formed by an omitted plate length or perforation for each ring or turn.

5. A silo according to claim 4, wherein said unbroken plate lengths and areas unoccupied by plate lengths alternate with each other in each ring or turn.

6. A silo according to claim 4, wherein said unbroken plate lengths and said open surfaces or omitted plate lengths form said gravity shaft in a spiral pattern.

7. A silo according to claim 4, wherein said gravity shaft is produced by means of supporting sections which are peripherally distributed or extend in corners throughout the height of all said rings or turns, of which adjacent sections are overbridged by plane, curved and angular plate lengths, or are left uncovered by plate lengths.

8. A silo according to claim 7, wherein said supporting sections are angular sections with the edge of the angle turned towards the inside of the shaft and their branches being connectible, to angled edges of said plate lengths.

9. A silo according to claim 7, wherein said supporting sections and said plate lengths are angle sections having the edge of the angle directed outwards, and the branches of said plate lengths are connectible to the branches of said supporting sections.

10. A silo according to claim 1, wherein, said shaft closing means comprises at least one measuring element provided in said shaft, means for turning of an extraction conveyor removing the material at the bottom of said shaft, said measuring element being arranged to measure the maximum height of a plug of material building up within said shaft when said extraction conveyor is turned off, and switch means actuated by said measuring element for switching off said feed elements feeding the material to said shaft.

11. A silo according to claim 1, wherein said shaft closing means comprises a slider slidably positioned at the bottom of said shaft.

12. A silo according to claim 1, wherein said shaft closing means comprises a plug of material developed as a result of non-removal of the material from the bottom of the shaft.

* * * * *